UNITED STATES PATENT OFFICE.

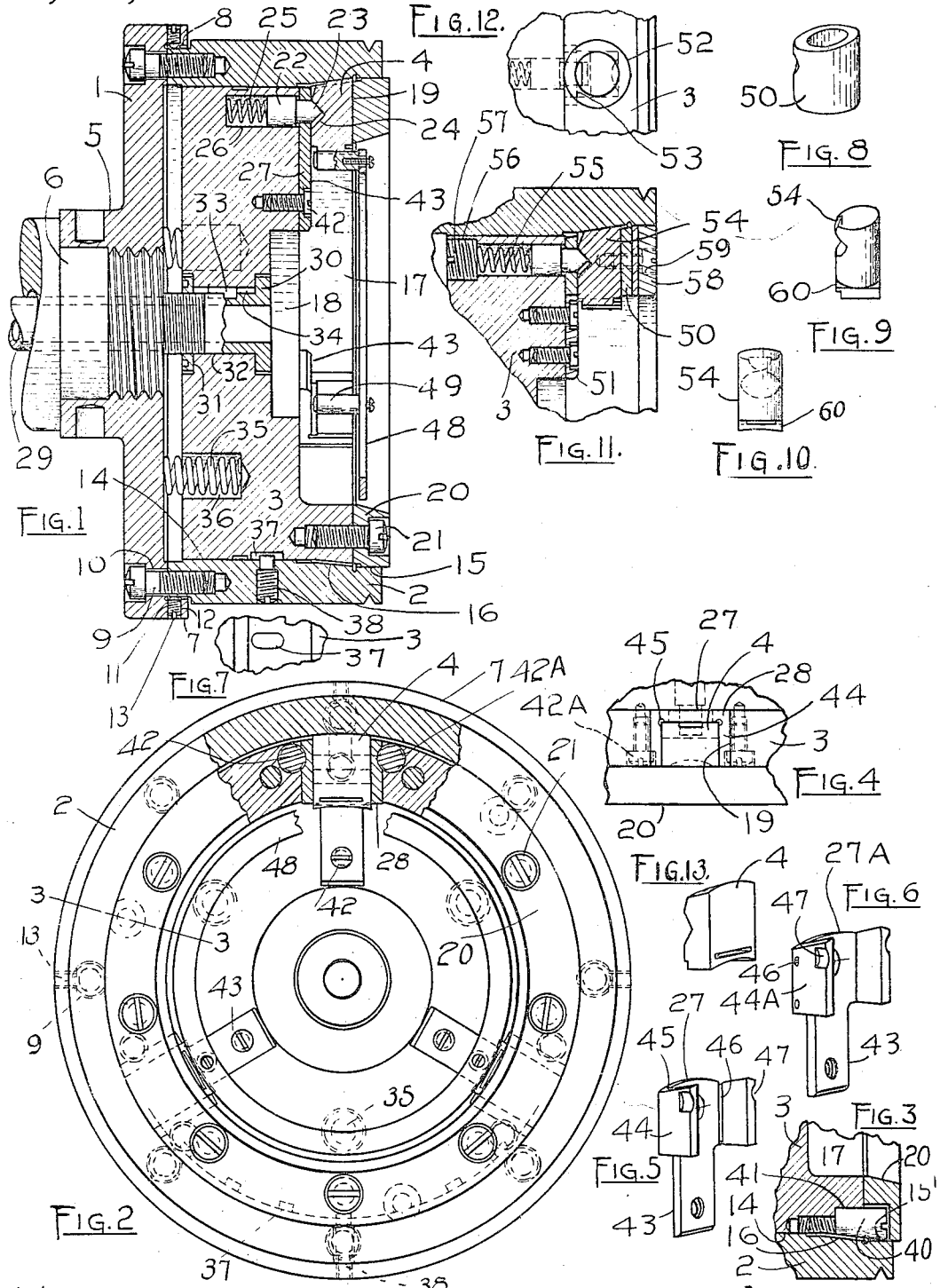

AUGUSTUS B. BOLENDER, OF MUNCIE, INDIANA.

GEAR-HOLDING CHUCK.

1,290,885. Specification of Letters Patent. Patented Jan. 14, 1919.

Application filed October 23, 1917. Serial No. 198,165.

*To all whom it may concern:*

Be it known that I, AUGUSTUS B. BOLENDER, a citizen of the United States, residing at Muncie, in the county of Delaware and State of Indiana, have invented certain new and useful Improvements in Gear-Holding Chucks, of which the following is a specification.

My invention relates to improvements in gear holding chucks of that type forming the subject matter of my application, filed August 26, 1916, and serially numbered 116,981.

One object of the present invention is the provision of a chuck of the above stated character wherein the body-carrying and jaw-operating sleeve shall be so mounted as to permit of its being adjusted to effect the truing of the chuck.

A further object is the provision of a chuck of the above stated character wherein the body shall be mounted for movement with respect to the sleeve, whereby to permit the movement of the jaws into active or gear-holding position or to release them.

A still further object is the provision of a jaw shoe having a water tight contact with the jaw.

Another object is the provision of a jaw shoe which may be manufactured at a comparatively low cost.

With the above and other objects in view, the invention consists in the construction, combination and arrangement of parts hereinafter more fully described and claimed, and illustrated in the accompanying drawings, wherein:

Figure 1 is a longitudinal sectional view, taken on a plane extending vertically and centrally through a chuck constructed in accordance with my invention.

Fig. 2 is a view in front elevation of the chuck, the upper portion of the chuck being in vertical section.

Fig. 3 is a section on the line 3—3 of Fig. 2.

Fig. 4 is a top plan view of a portion of the front end of the body of the chuck.

Fig. 5 is a detail perspective view of one of the jaw shoes.

Fig. 6 is a similar view of a modified form of jaw shoe.

Fig. 7 is a top plan view of another portion of the body.

Fig. 8 is a detail perspective view of a further modified form of jaw shoe.

Fig. 9 is a detail perspective view of the jaw adapted for use in connection with the form of jaw shoe illustrated in Fig. 8.

Fig. 10 is a front elevation of the jaw shown in Fig. 9.

Fig. 11 is a sectional view illustrating the application of the jaw and jaw shoe shown in Figs. 8, 9 and 10.

Fig. 12 is a top plan view illustrating the application of the jaw and jaw shoe, and Fig. 13 is a detail perspective of the jaw shown applied in Figs. 1, 2 and 4.

Referring to the drawings by reference characters, 1 designates the face plate, 2 the body-carrying and jaw-actuating sleeve, 3 the body and 4 the jaws of my improved chuck.

The face plate 1 is preferably circular. It is provided with a hub 5 in which one end of the work spindle 6 of a grinding machine is suitably secured. An annular flange 7 is formed on and extends forwardly beyond the front side of the face plate 1. This flange provides a recess 8 for the reception of the rear end of the sleeve 2 which is secured by bolts 9 to the face plate against any axial movement with relation thereto. The bolts 9 pass through openings 10 in the face plate 1 and have threaded engagement with the sleeve 2.

The sleeve 2 has a loose radial fit in the recess 8 and the bolts 9 have a loose radial fit in the openings 10, so as to permit the sleeve 2 to be adjusted radially on the face plate 1 with relation to the axis of the chuck when it is desired to true the chuck. To permit the sleeve 2 to be used in truing the chuck, its outer surface is ground true. Screws 11, which are threadedly mounted in openings 12 in the flange 7 and which engage the periphery of the sleeve 2, provide means by which the sleeve 2 may be adjusted on the face plate 1 when it is desired to true the chuck. The screws 11 are preferably provided with slots 13 to permit them to be operated by a screw driver. The inner surface of the sleeve 2 consists of an inner cylindrical portion 14, an outer cylindrical portion 15 and an intermediate annular beveled portion 16.

The body 3 is cylindrical and it is positioned in the sleeve 2. In its front side it is provided with a gear-receiving recess 17, and in rear of this recess with a recess 18 to receive one end of the hub of the gear. To receive the jaws 4, the body 3 is provided in the plane of the recess 17 with radially extending openings 19 which open out through the front side of the body. The jaws 4 are held in the openings 19 against axial displacement by a ring 20 which is secured to the body 3 by bolts 21.

The outer ends of the jaws 4 are beveled and engage the annular bevel 16 of the sleeve 2, and their inner ends are arcuate. The jaws are normally held in inactive position by spring pressed puppets 22 which have beveled outer ends 23 fitting in V-shaped recesses 24 in the jaws. The puppets 22 and their springs 25 are mounted in the sockets 26 and are retained therein by the rear walls 27 of shoes 28.

The body 3 engages the portion 14 of the inner wall of the sleeve 2 and the ring 20 engages the portion 15. The contact between these parts and the contact between the rear end of the sleeve 2 and face plate 1, are such as to render the chuck emery dust and water proof.

By reason of the engagement between the outer beveled ends of the jaws 4 and the annular bevel 16 of the sleeve 2, a rearward movement of the body 3 with relation to the sleeve 2 forces the jaws into active or gear holding position, and a forward movement of the body 3 with relation to the sleeve 2 permits the puppets 22 to move the jaws 4 into and hold them in inactive or gear releasing position. To permit a gear actuating movement to be imparted to the body 3, a draw bar 29 is provided. This bar passes through the work spindle 6 and has a loose radial fit therein to permit the sleeve 2 to be adjusted as heretofore described. The forward end of the draw bar 29 is secured by a collar 30 and nut 31 in the bore 32 of the body 3. A key 33 carried by the draw bar 29 fits in a slot 34 in the wall of the bore 32 and prevents any relative rotary movements between the bar and body. Any suitable means, not shown, may be connected to the draw bar 29 to permit a jaw actuating movement to be imparted to the body 3 and to permit the body 3 to be held in position to retain the jaws 4 in active or gear engaging position. When released the body 3 is moved into and held in jaw releasing position by springs 35 which are located in sockets 36 in the body 3 and which engage the face plate 1.

To hold the body 3 against rotation with relation to the sleeve 2, and to permit the body to be adjusted rotatably with relation to the sleeve so as to position the beveled ends of the jaws 4 in contact with new portions of the bevel 16 when those portions of the bevel in contact with the jaws become worn, the body is provided in its periphery with a plurality of slots 37 and the sleeve 2 carries a screw 38 which engages in one of the slots. So as not to interfere with the movement of the body 3 in jaw actuating or jaw releasing direction, the slots 37 are elongated and extend axially of the body 3. When it is desired to position the beveled ends of the jaws 4 in contact with new portions of the bevel 16, the screw 38 is turned outwardly and the body 3 turned with relation to the sleeve 2 until another slot 37 is in position to receive the screw, and then the screw 38 is turned inwardly to position its inner end in the slot. This permits the entire bevel to be used before it becomes necessary to retrue the bevel, and thereby greatly increases the life of the chuck.

The body carries studs 40 which engage the portion 15 of the inner wall of the sleeve 2, and the body 3 at 41. The studs 40 prevent accidental displacement of the sleeve 2, ring 20 with relation to body 3.

The shoes 28 are secured in the openings 19 by bolts 42 and 42$^a$ and form wear surface therefor. Each shoe 28 consists of the relatively long rear wall 27, which extends into the recess 17 to provide gear rests 43, and side walls 44 which are formed integrally with the rear wall 27. In drill holes 45 in the corners of the shoes lead 46 or any other suitable material is placed to make the shoes water tight around the jaws 4. A detail perspective view on this shoe is shown in Fig. 5 of the drawings.

In Fig. 6 there is shown a detail perspective view of a modified form of the shoe. In this form the rear wall 27$^a$ and the side walls 44$^a$ are formed separately and secured together by screws 46. This form of the shoe may be manufactured at a comparatively low cost.

In both forms of the shoe, the side walls are provided with recesses 47 for the reception of the heads of the bolts 42$^a$.

As shown in Fig. 8 of the drawings, the jaw shoes may be made cylindrical. This jaw shoe is designated 50 and is provided with a gear rest 51. Jaw shoes of this form are mounted in cylindrical openings 52 in the body 3, and are held therein against rotation and radial displacement by any suitable means such as shown at 53. When used in connection with shoes of this type or form, the jaw is cylindrical, such a jaw being shown at 54 in Fig. 9 of the drawings. The jaws 54 have a close sliding fit with the shoe 50 so as to establish an emery dust and water proof contact between the jaws and the shoes. The application of this form of jaw and jaw shoe is illustrated in Figs. 11 and 12 of the drawings. By reference to these figures, it will be seen that the openings 52 do not extend through the front side of the body 3, and to permit the application and removal of the spring pressed puppets the bores 55 which are provided for the reception of the puppets and their springs, open out through the rear side of the body. The rear ends of the bores 55 are enlarged as at 56 for the reception of plugs 57 which together with the jaw shoes 50 prevent accidental displacement of the puppets and springs. The front side of the body is provided with a ring 58 which is secured in place by screws 59 and which protects the body 3 and forms in conjunction with the portion 15 of sleeve 2 a water-proof joint at the front of the chuck. As shown in Fig. 9, the jaw 54 is provided with a flat portion 60 which rests against the gear rest 51 to prevent rotation of the jaw when in working position.

A ring 48 carrying rollers 49 is employed. The rollers 49 are set between the teeth of the gear to be worked upon and are engaged by the arcuate inner or active faces of the jaws 4 when the gear is placed in the recess 17.

While I have shown and described the preferred embodiment of my invention, it will be understood that minor changes in the construction, combination and arrangement of parts may be made without departing from the spirit and scope of the invention as claimed.

What is claimed is:

1. A chuck including a face plate, and a body carrying sleeve mounted on the face plate for radial adjustment with relation thereto to permit the chuck to the trued.

2. A chuck including a face plate, and a body carrying and jaw actuating sleeve mounted on the face plate for radial adjustment with relation thereto to permit the chuck to be trued.

3. A chuck including a face plate having a recess, a sleeve having a loose fit in the recess, means connecting the sleeve to the face plate, and a jaw carrying body mounted in the sleeve.

4. A chuck including a face plate, a body, jaws carried by the body, a jaw actuating sleeve carrying the body, and means connecting the sleeve to the face plate for radial adjustment with relation thereto.

5. A chuck including a face plate, a jaw actuating sleeve, means securing the sleeve to the face plate for radial adjustment with relation thereto, a body movably mounted in the sleeve, jaws carried by the body, and means for moving the body with respect to the sleeve for actuating the jaws.

6. A chuck including a face plate, a jaw actuating sleeve, means securing the sleeve to the face plate for radial adjustment with relation thereto, a body movably mounted in the sleeve, jaws carried by the body, means for moving the body with respect to the sleeve in one direction to move the jaws into active position, means for moving the body with respect to the sleeve in the reverse direction, and means for returning the jaws to inactive position.

7. A chuck including a face plate, a sleeve carried by the face plate, a body movably mounted in the sleeve, jaws carried by the body, springs positioned between the body and face plate, and a draw bar connected to the body.

8. A chuck including a face plate, a sleeve carried by the face plate and having an annular bevel, a body movably mounted in the sleeve, jaws carried by the body and engaging the bevel of the sleeve, body actuating means, and means securing the body against rotary movement with relation to the sleeve and permitting the rotary adjustment of the body with relation to the sleeve to position the jaws in contact with new portions of the bevel.

9. A chuck including a face plate, a body carrying and jaw actuating sleeve, means connecting the sleeve to the face plate for radial adjustment with relation thereto, and means carried by the face plate to permit the adjustment of the sleeve and to hold the sleeve in adjusted position.

10. A chuck including a face plate provided with a flange, a body carrying and jaw actuating sleeve having one end positioned within the flange, and means connecting the sleeve to the face plate for radial adjustment with relation thereto.

11. A chuck including a face plate provided with a flange, a body carrying and jaw actuating sleeve having one end positioned within the flange, means connecting the sleeve to the face plate for radial adjustment with relation thereto, and sleeve adjusting means carried by the face plate.

12. A chuck including a face plate provided with a flange, a body carrying and jaw actuating sleeve having one end positioned within the flange, means connecting the sleeve to the face plate for radial adjustment with relation thereto, and sleeve adjusting means carried by the flange.

13. A chuck including a face plate, a body, jaws carried by the body, a body carrying and jaw actuating sleeve carried by the face plate, and means for actuating the body with relation to the sleeve, the connection between the body and sleeve and sleeve and face plate rendering the chuck emery dust and water proof.

14. A chuck including a shoe provided in its corners with drill holes, lead in said holes, and a jaw slidably mounted in said shoe and engaging the lead to establish a water tight connection between the shoe and jaw.

15. A chuck including a face plate, a sleeve having its outer surface ground true, and means securing the sleeve to the face plate for radial adjustment with relation thereto.

In testimony whereof I affix my signature in the presence of two witnesses.

AUGUSTUS B. BOLENDER.

Witnesses:
 DONALD D. HENSEL,
 LEONIDAS A. GUTHRIE.